(12) United States Patent
Suchak et al.

(10) Patent No.: US 8,541,623 B2
(45) Date of Patent: Sep. 24, 2013

(54) OXIDATION METHOD AND REACTOR

(75) Inventors: Naresh Suchak, Glen Rock, NJ (US); Zhixiong Cha, Scotch Plains, NJ (US); Frank R. Fitch, Bedminster, NJ (US)

(73) Assignee: Linde Aktiengesellschaft, Munich (DE)

( * ) Notice: Subject to any disclaimer, the term of this patent is extended or adjusted under 35 U.S.C. 154(b) by 142 days.

(21) Appl. No.: 12/984,206

(22) Filed: Jan. 4, 2011

(65) Prior Publication Data

US 2012/0172629 A1     Jul. 5, 2012

(51) Int. Cl.
*C07C 45/00* (2006.01)
*C07F 15/00* (2006.01)
*B01J 19/00* (2006.01)

(52) U.S. Cl.
USPC .......................................... 568/300; 422/129

(58) Field of Classification Search
USPC ........................................ 568/300; 422/129
See application file for complete search history.

(56) References Cited

FOREIGN PATENT DOCUMENTS

| EP | 0 261 822 A2 | 3/1988 |
| EP | 0 682 000 A1 | 11/1995 |

*Primary Examiner* — Sikarl Witherspoon
(74) *Attorney, Agent, or Firm* — Philip H. Von Neida

(57) ABSTRACT

A method and apparatus for increasing the concentration of oxygen in the reaction medium present in the oxidation reactor. A volume of aqueous medium from the oxidation reactor is removed and pressurized and oxygen is added to it. The oxygen-rich volume of aqueous medium is then reintroduced into the oxidation reactor at an increased pressure to ensure adequate mixing with the aqueous medium having a lower content of oxygen.

28 Claims, 1 Drawing Sheet

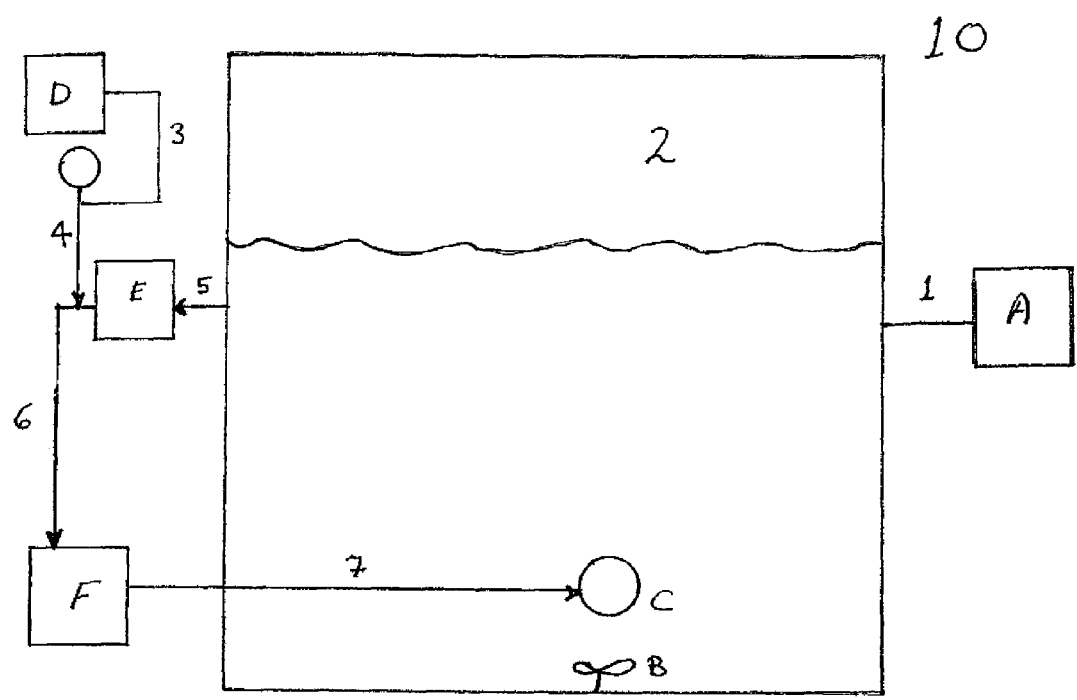

OXIDATION METHOD AND REACTOR

BACKGROUND OF THE INVENTION

The invention relates to a method and apparatus for the oxidation of reactants in an aqueous reaction medium using gaseous molecular oxygen to increase the concentration of oxygen in the aqueous reaction medium and improve the efficiency of the reaction process.

Industrially, aqueous phase oxidations are carried out using a variety of oxygen sources such as air, oxygen and oxidative reagents such as hydrogen peroxide. At industrial scales, oxidations with air and oxygen are a far lower cost alternative compared to oxidation with oxidative reagents but pose a challenge due to their inherently low solubility of oxygen in water. Oxygen solubility in water decreases with increase in concentration of solutes, especially ions, as well as with an increase in temperature. When oxidation reactions are utilized in the production of chemicals, waste water and scrubber effluents often have high concentrations of solutes and the oxidation is carried out at an elevated reaction temperature Both of these factors decrease the effective oxygen solubility Air is often perceived as the lower cost alternative compared to oxygen for gas-liquid oxidation systems but at times, oxidation with air is not intense enough in a given apparatus, oxidation system or gas-liquid contacting equipment and oxygen provides a viable alternative.

There are a variety of oxidation reactors used in process industry today and in addition to dissolution of oxygen, many other process requirements such as heat transfer, suspension of solids, mixing and safety, including keeping the vapor space outside of explosive limits, influence the selection of the type of reactor. Economic factors such as equipments costs, power consumption, operational complexity and reliability and maintenance are also important in determining an optimum and viable oxidation system.

One key consideration in the design of any oxidation system using gaseous molecular oxygen is to ensure the optimal utilization of oxygen.

Typical oxidation reactors are stirred tank reactors or columns under ambient pressures where oxygen is sparged at the bottom. In a simple bubble column or tank, where oxygen is sparged, gas bubbles rise in the aqueous medium while some oxygen gas dissolves in the aqueous medium and the remaining oxygen disengages from the liquid pool when it reaches the liquid surface at the top. If the tank or column is open which is typical of most mineral processing and waste water oxidation systems, oxygen disengaging the liquid surface, along with vapors of aqueous medium escape to the atmosphere.

For the production of chemicals, however, it is not often an option to allow an oxygen rich stream to escape to the atmosphere and the process industry uses tanks and columns with lids. The disengaging gaseous bubbles are collected in the ullage of the tank or vapor space of the column and recycled back to the sparger by means of a compressor or blower. This can add significant amount of costs in terms of energy and processing equipment despite a more effective utilization of oxygen.

Stirred tank reactors (STR) with gas sparging often provide better dissolution of oxygen compared to simple bubble columns or non-agitated tanks. However, the use of STR is limited to applications with smaller oxidation volumes and scale up to very large reactors is not common. In addition, for better utilization efficiency, an oxygen recycle loop may be necessary.

High pressure bubble columns and STR often provide far superior performance with oxidation and gas dissolution but they are several fold higher in cost compared to ambient pressure systems and in addition may require an oxygen recycle loop. When the rate of the oxidation reaction is slow, high pressure systems assist in intensifying the reaction due to a higher dissolved oxygen concentration. The use of high pressure bubble columns and STR are generally limited to applications with smaller oxidation requirements.

For larger oxidation volumes, oxidation systems of large tanks with external loops are often used. Oxygen in these processes is dissolved in a small stream of an aqueous medium withdrawn from the main vessel and oxygen gas is intensely mixed using static or dynamic mixing devices, sometimes even saturated and reintroduced along with very large number of gas bubbles into the main vessel. External pumps are used to drive the fluid through the external loops. In some systems, the aqueous medium withdrawn is subjected to oxygen at higher pressure in a separate vessel and oxygen is dissolved and saturated at higher pressure prior to being reintroduced back into the bulk liquid to form bubbles. For all these systems, the intention is to maximize either oxygen utilization or the rate of oxygen uptake.

Special consideration can be given to oxidation reactions where "M" is dissolved in an aqueous medium and oxidized with molecular oxygen. This is represented by the following reaction:

$$M + x/2 O_2 \rightarrow MOx$$

In a given oxidation system, a reaction is classified as very slow if the dissolution of oxygen is much faster compared to its consumption in the oxidation reaction.

In such a case, there will be a finite concentration of dissolved oxygen in the bulk of the aqueous phase. The concentration of the dissolved oxygen will be between negligible on the lower limit value and the equilibrium solubility concentration as the upper limit. The specific rate of oxidation is mathematically expressed as:

$$R = k_{mn} * [M]^m * [O_2]^n$$

Where R is specific reaction rate;
$k_{mn}$ is the oxidation rate constant, generally a function of temperature;
$m^{th}$ order with respect to M;
$n^{th}$ order with respect to oxygen;
[M] is the concentration of solute to be oxidized; and
[$O_2$] is the concentration of dissolved oxygen.

The concentration of solute to be oxidized [M] in the batch reactor starts at a very high concentration at the beginning of a batch operation and as oxidation proceeds, [M] reaches lower concentration slowing the specific reaction rate considerably towards completion of the batch.

The specific rate is maximized when the concentration of dissolved oxygen approaches solubility at a given pressure. In order to maintain specific rates close to the maximum, high levels of dissolved oxygen are necessary. These high levels are achieved by contacting a large excess of molecular oxygen gas which must be reutilized by recycling or wasted and both of these add to capital costs or operating costs.

In addition to maximizing the specific oxidation rate, reactions are conducted at higher temperature. Generally the increase in the reaction temperature increases the kinetic rate constant "$k_{mn}$" but reduces the solubility of oxygen and dissolved oxygen concentration. Alternatively increasing pressure along with temperature is a different approach but in very large scale production, the oxidation of low cost feed stocks such as minerals, ores and low cost inorganic chemicals, capital intensive large pressure vessels are not economically attractive and therefore a lower cost, efficient solution is necessary. The present invention addresses this need by providing an improved oxidation process and apparatus that not only achieves high oxygen utilization efficiency, but also offers enhanced rates of oxygen uptake.

SUMMARY OF THE INVENTION

In a first embodiment of the invention, there is disclosed a method for oxidizing a material in an oxidation reactor, wherein the oxidation reactor further comprises an external circulation loop having means to increase the pressure in the external loop comprising the steps of:

Measuring the concentration of oxygen in the oxidation reactor;

Withdrawing a volume of aqueous medium from the oxidation reactor and measuring the concentration of oxygen in the volume;

Feeding oxygen into the volume to achieve a desired concentration of oxygen;

Feeding the volume back into the oxidation reactor at an elevated pressure and through a venturi device to provide high back pressure to the flow of the volume; and Forming a circulation pattern within the oxidation reactor whereby a higher concentration of oxygen is maintained in the aqueous medium at the bottom of the oxidation reactor.

The amount of oxygen added to the volume is controlled to ensure dissolution of the oxygen. The amount of oxygen added to the volume is also determined by the flow rate of oxygen leaving the oxidation reactor. Alternatively, the amount of oxygen added to the volume is determined by the concentration of dissolved oxygen in the oxidation reactor. However, the amount of oxygen added to the volume is controlled to inhibit the formation of free bubbles in the oxidation reactor.

The depth within the oxidation reactor at which the volume is added is that depth which will help minimize degassing of oxygen gas into the aqueous medium.

The feeding of the volume into the oxidation reactor will agitate the contents of the oxidation reactor thereby suspending solids within the aqueous medium and improving heat transfer in the contents thereof.

The invention further comprises a method for increasing the concentration of oxygen in an oxidation reactor comprising the steps:
a) withdrawing a volume of aqueous medium from said oxidation reactor and raising pressure of the withdrawn aqueous medium;
b) feeding oxygen to said volume of aqueous medium and substantially dissolving almost all gaseous oxygen;
c) feeding the oxygen-enriched volume of aqueous medium back to said oxidation reactor; and
d) mixing said oxygen-enriched volume of aqueous medium into the bulk of an aqueous medium in said oxidation reactor.

Alternatively, the invention comprises a method for improving the oxidation of reactants in an oxidation reactor comprising the steps:
a) withdrawing a volume of aqueous medium from said oxidation reactor and raising pressure of the withdrawn aqueous medium;
b) feeding oxygen to said volume of aqueous medium and substantially dissolving almost all gaseous oxygen;
c) feeding the oxygen-enriched volume of aqueous medium back to said oxidation reactor; and
d) mixing said oxygen-enriched volume of aqueous medium into the bulk of an aqueous medium in said oxidation reactor.

The oxygen is fed to the withdrawn volume of aqueous medium at elevated pressures (in the range of 0 to 20 barg) while the oxidation reactor is maintained at about ambient pressures. The oxygen can be derived from any source such as an on-site oxygen generator or a bulk liquid oxygen tank or a cylinder of oxygen. A pump can be employed to assist in removing the volume of aqueous medium from the oxidation reactor and elevating it to higher pressure. The aqueous medium can be saturated at higher pressure by feeding oxygen using an oxygen dissolution device such as a gas diffuser or a sparger, a static mixer or venturi device or combination thereof.

The oxygen-enriched volume of aqueous medium is introduced into the oxidation reactor with high velocity through one or more nozzles or converging pipes capable of converting pressure energy into kinetic energy. This introduction is typically at a depth to form a high hydrostatic head to minimize or prevent degassing of the dissolved oxygen and to provide mixing with the bulk of the aqueous medium already present in the oxidation reactor. The amount of oxygen in the withdrawn volume of aqueous medium can approach saturation at an elevated pressure and is in general at a higher concentration than the aqueous medium present in the oxidation reactor. The withdrawal of a volume of aqueous medium can also be performed periodically as the reaction in the oxidation reactor proceeds.

In yet another embodiment, the invention comprises a method of oxidizing an organic material in an oxidation reactor, wherein the oxidation reactor further comprises an external circulation loop having means to increase the pressure in the external loop comprising the steps of:
a) measuring the concentration of oxygen in the oxidation reactor;
b) withdrawing a volume of organic medium from the oxidation reactor and measuring the concentration of oxygen in the volume;
c) feeding oxygen into the volume to achieve a desired concentration of oxygen;
d) feeding the volume back into the oxidation reactor at an elevated pressure and through a venturi device to provide high back pressure to the flow of the volume); and
e) forming a circulation pattern within the oxidation reactor whereby a higher concentration of oxygen is maintained in the organic medium at the bottom of the oxidation reactor.

The invention also comprises an apparatus comprising an oxidation reactor; means for withdrawing an aqueous medium from the oxidation reactor; means for feeding oxygen to the aqueous medium at an elevated pressure; and means for introducing the aqueous medium back into the oxidation reactor.

The means for withdrawing an aqueous medium from the oxidation reactor comprises a pump. The means for introducing the aqueous medium which has a higher concentration of oxygen back into the oxidation reactor comprises a device such as set of nozzles or a liquid inducing nozzle. The rate for feeding oxygen to the aqueous medium is controlled by a programmable logic controller.

The method of the invention involves withdrawing a measured volume of aqueous medium from a reaction vessel, subjecting and dissolving molecular oxygen at an elevated pressure into the withdrawn volume and reintroducing the dissolved oxygen-rich medium back into the vessel which is maintained at ambient pressure. This oxygen rich volume is reintroduced into the oxidation reaction vessel at the desired depth with high kinetic energy such as that provided by a set of nozzles so as to cause a thorough mixing of the oxygen-enriched aqueous medium with the bulk of the aqueous medium in the oxidation reaction vessel. The mixing of the oxygen-enriched aqueous medium is conducted to cause mixing for suspended solids, reducing heat gradients, improving heat transfer and inhibiting formation of oxygen bubbles in the bulk of the liquid phase. The amount of saturation of the oxygen-enriched aqueous medium is carefully controlled so as to prevent gaseous bubble formation in the bulk liquid phase in the oxidation reaction vessel and therefore all oxygen remains in the dissolved state available in the liquid phase for homogeneous liquid or solid-liquid reactions.

Furthermore, the oxygen enriched medium can be introduced by one or more symmetrically placed nozzles to cause circulation pattern otherwise obtained by stirring. As such, tanks without stirrer may also be used as oxidation reactors. Temperature control in any oxidation reactor is generally an important factor in its operation. The aqueous medium may be heated or heat may be removed in an external loop or through heat transfer surfaces or one or more traditional methods used in cooling and heating reactor such as circulating heat transfer fluids through either jacket or limpet coil attached to the reactor wall or heating/cooling coil placed inside the oxidation reactor.

The invention further provides for minimizing the loss of dissolved oxygen and gaseous bubble formation in the atmospheric pressure reaction vessel while maintaining the content of the vessel at the desired temperature by removing or adding heat thereby improving oxidation of the reactant components present in the oxidation reaction vessel. This method improves use of mass transfer, momentum transfer, heat transfer, mixing technique with instrumentation and control for economically advantageous, inherently safe, reliable and stable oxidation system.

BRIEF DESCRIPTION OF THE DRAWINGS

The FIGURE is a schematic of an oxidation reactor system of the invention.

DETAILED DESCRIPTION OF THE INVENTION

Turning to the FIGURE, an oxidation reactor according to the invention is shown. The oxidation reactor 10 contains the reaction medium liquid which is typically an aqueous medium containing reactants necessary for the production of chemicals, pharmaceuticals, fine chemicals, etc. The open area ullage 2 can be of various volume depending upon the overall size of the oxidation reactor and the amount of aqueous medium present therein. This invention also applies to reactors with lids i.e. covered ullage but maintained near ambient pressures. The oxidation reactor 10 may or may not be equipped with a stirrer B. If stirrer is provided it will be used as primary means to mix the reactive ingredients. A meter A is fluidly connected through line 1 to the oxidation reactor 10 to measure the concentration of oxygen in the aqueous medium.

An oxygen supply is connected through line 4 to a pump E which will be actuated to remove some of the aqueous medium present in the oxidation reactor 10 through line 5. This aqueous medium which is typically an aqueous medium contains a certain level of oxygen but is typically an unsaturated amount of oxygen. The pump E delivers this aqueous medium to a venturi F but before the aqueous medium reaches the venturi, oxygen is fed into the aqueous medium through line 6 at an elevated pressure. This will increase the concentration of oxygen present in the aqueous medium being fed to the venturi F through line 6 to an amount approaching if not actually becoming saturated at an elevated pressure. A programmable logic controller (PLC) D connects to the oxygen feed 4 and will determine based on the desired amount of oxygen in the aqueous medium how much oxygen is fed into the aqueous medium in line 6.

The oxygen-enriched aqueous medium is fed through the venturi F at higher pressure (0 to 20 Barg) through line 7 into the oxidation reactor 10. Nozzle(s) placed at the end of the line 7 introduces pressurized liquid medium into the reactor 10 at depth to a liquid distributor C. Nozzle(s) will convert pressure energy into kinetic energy which will circulate the oxygen-enriched aqueous medium into the remainder of the oxygen unsaturated aqueous medium already present in the oxidation reactor 10. By performing this reintroduction of saturated medium into the oxidation reactor, oxygen oversaturation is avoided and the right amount of oxygen for reaction purposes can be controllably fed into the oxidation reactor 10.

In another embodiment, oxygen is introduced not in the line 6 but at the throat of the venturi and thereby saturation of oxygen occurs in the venturi and the line 7 downstream of the venturi.

In another further embodiment, one or more liquid inducing nozzles are used at the end of line 7. These nozzles induce unsaturated aqueous medium from the vicinity of the nozzles and mixed stream approaching full oxygen saturation with high kinetic velocity emerging from the nozzle. The momentum of the stream exiting the nozzle provides agitation and mixing for better reaction and temperature control in the oxidation reactor.

In yet another embodiment, the reaction medium is an organic solvent and oxygen is used for oxidation of organics in the organic solvent. The methods and apparatus as described for an aqueous medium are applicable where the reaction medium is organic and/or the reactants being organic.

As the method described in this invention, inhibiting or minimizing bubbles of oxygen in the oxidation reactor and maintaining oxygen in a dissolved state offers inherently safer conditions in the ullage of the reactor with respect to explosion hazards.

In yet another further embodiment, oxidation of organics, there is no solvent and the reactant itself dissolves oxygen.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for oxidizing a material in an oxidation reactor, wherein said oxidation reactor further comprises an external circulation loop having means to increase the pressure in said external loop comprising the steps of:
   a) measuring the concentration of oxygen in said oxidation reactor;
   b) withdrawing a volume of aqueous medium from said oxidation reactor and measuring the concentration of oxygen in said volume;
   c) feeding oxygen into said volume as a dissolved species and allowing sufficient residence time to achieve a desired concentration of oxygen, wherein the oxygen feed amount is determined by measuring dissolved oxygen in the reactor and its pressure, and measuring the density of the volume and the concentration of oxygen in the ullage;

d) feeding said volume back into said oxidation reactor at an elevated pressure and through a venturi device to a liquid distributor; and e) forming a circulation pattern within said oxidation reactor whereby a higher concentration of oxygen is maintained in the aqueous medium at the bottom of said oxidation reactor, and wherein the external circulation loop is maintained at pressure during steps c), d) and e).

2. The method as claimed in claim 1 wherein the amount of oxygen added to said volume is controlled to ensure dissolution of said oxygen.

3. The method as claimed in claim 1 wherein the amount of oxygen added to said volume is determined by a process selected from the group consisting of the flow rate of oxygen leaving said oxidation reactor and the concentration of dissolved oxygen in said oxidation reactor.

4. The method as claimed in claim 1 wherein the amount of oxygen added to said volume is controlled to inhibit formation of free bubbles in said oxidation reactor.

5. The method as claimed in claim 1 wherein the depth at which said volume is added to said liquid distributor is sufficient to provide high back pressure to the flow of said volume.

6. The method as claimed in claim 1 wherein feeding of said volume into said oxidation reactor agitates the contents of said oxidation reactor thereby suspending solids and improving heat transfer in said oxidation reactor.

7. A method for increasing the concentration of oxygen in an oxidation reactor comprising the steps:
   a) withdrawing a volume of aqueous medium from said oxidation reactor and measuring the concentration of oxygen in the volume;
   b) feeding oxygen as a dissolved species to said volume of aqueous medium and allowing for sufficient residence time to achieve a desired concentration of oxygen, wherein the oxygen feed amount is determined by measuring dissolved oxygen in the reactor and its pressure, and measuring the density of the volume and the concentration of oxygen in the ullage;
   c) feeding the oxygen-enriched volume of aqueous medium back to said oxidation reactor; and
   d) mixing said oxygen-enriched volume of aqueous medium into an aqueous medium in said oxidation reactor.

8. The method as claimed in claim 7 wherein said oxygen is fed at an elevated pressure.

9. The method as claimed in claim 7 wherein said oxidation reactor is maintained at ambient pressure.

10. The method as claimed in claim 7 wherein said oxygen-enriched volume of aqueous medium is introduced into said oxidation reactor through a venturi device.

11. The method as claimed in claim 7 wherein the oxygen-enriched volume of aqueous medium is introduced at a depth to provide mixing with said aqueous medium.

12. The method as claimed in claim 7 wherein said oxygen-enriched volume of aqueous medium approaches oxygen saturation.

13. The method as claimed in claim 7 wherein a pump is used to increase the pressure of said oxygen-enriched aqueous medium.

14. The method as claimed in claim 7 wherein said withdrawing of a volume of aqueous medium is performed in a periodic fashion.

15. A method for improving the oxidation of reactants in an oxidation reactor comprising the steps:
   a) withdrawing a volume of aqueous medium from said oxidation reactor;
   b) feeding oxygen as a dissolved species to said volume of aqueous medium and allowing sufficient residence time to achieve a desired concentration of oxygen, wherein the oxygen feed amount is determined by measuring dissolved oxygen in the reactor and its pressure, and measuring the density of the volume and the concentration of oxygen in the ullage;
   c) feeding the oxygen-enriched volume of aqueous medium back to said oxidation reactor; and
   d) mixing said oxygen-enriched volume of aqueous medium into an aqueous medium in said oxidation reactor.

16. The method as claimed in claim 15 wherein said oxygen is fed at an elevated pressure.

17. The method as claimed in claim 15 wherein said oxidation reactor is maintained at ambient pressure.

18. The method as claimed in claim 15 wherein said oxygen-enriched volume of aqueous medium is introduced into said oxidation reactor through a venturi device.

19. The method as claimed in claim 15 wherein the oxygen-enriched volume of aqueous medium is introduced at a depth to provide mixing with said aqueous medium.

20. The method as claimed in claim 15 wherein said oxygen-enriched volume of aqueous medium approaches oxygen saturation.

21. The method as claimed in claim 15 wherein a pump is used to increase the pressure of said oxygen-enriched aqueous medium.

22. The method as claimed in claim 15 wherein said withdrawing of a volume of aqueous medium is performed in a periodic fashion.

23. A method for oxidizing an organic material in an oxidation reactor, wherein said oxidation reactor further comprises an external circulation loop having means to increase the pressure in said external loop comprising the steps of:
   a) measuring the concentration of oxygen in said oxidation reactor;
   b) withdrawing a volume of organic medium from said oxidation reactor and measuring the concentration of oxygen in said volume;
   c) feeding oxygen as a dissolved species into said volume and allowing sufficient residence time to achieve a desired concentration of oxygen, wherein the oxygen feed amount is determined by measuring dissolved oxygen in the reactor and its pressure, and measuring the density of the volume and the concentration of oxygen in the ullage;
   d) feeding said volume back into said oxidation reactor at an elevated pressure and through a venturi device to a liquid distributor; and
   e) forming a circulation pattern within said oxidation reactor whereby a higher concentration of oxygen is maintained in the organic medium at the bottom of said oxidation reactor, and wherein the external circulation loop is maintained at pressure during steps c), d) and e).

24. The method as claimed in claim 23 wherein the amount of oxygen added to said volume is controlled to ensure dissolution of said oxygen.

25. The method as claimed in claim 23 wherein the amount of oxygen added to said volume is determined by a process selected from the group consisting of the flow rate of oxygen leaving said oxidation reactor and the concentration of dissolved oxygen in said oxidation reactor.

26. The method as claimed in claim 23 wherein the amount of oxygen added to said volume is controlled to inhibit formation of free bubbles in said oxidation reactor.

27. The method as claimed in claim 23 wherein the depth at which said volume is added to said liquid distributor is sufficient to provide high back pressure to the flow of said volume.

28. The method as claimed in claim 23 wherein feeding of said volume into said oxidation reactor agitates the contents of said oxidation reactor thereby suspending solids and improving heat transfer in said oxidation reactor.

\* \* \* \* \*